US009600777B2

(12) United States Patent
Harik

(10) Patent No.: US 9,600,777 B2
(45) Date of Patent: Mar. 21, 2017

(54) CONFIGURING AND OPTIMIZING COMPUTATIONAL STRUCTURE FOR A MACHINE LEARNING APPLICATION USING A TUPLE OF VECTORS

(71) Applicant: Georges Harik, Palo Alto, CA (US)

(72) Inventor: Georges Harik, Palo Alto, CA (US)

(*) Notice: Subject to any disclaimer, the term of this patent is extended or adjusted under 35 U.S.C. 154(b) by 387 days.

(21) Appl. No.: 14/203,306

(22) Filed: Mar. 10, 2014

(65) Prior Publication Data
US 2014/0258206 A1    Sep. 11, 2014

Related U.S. Application Data

(60) Provisional application No. 61/776,628, filed on Mar. 11, 2013.

(51) Int. Cl.
*G06F 15/18* (2006.01)
*G06N 99/00* (2010.01)
*G06F 17/27* (2006.01)

(52) U.S. Cl.
CPC ......... *G06N 99/005* (2013.01); *G06F 17/276* (2013.01)

(58) Field of Classification Search
CPC ...... G06N 99/005; G06F 17/16; G10L 15/197
USPC .................................................... 706/12, 45
See application file for complete search history.

(56) References Cited

U.S. PATENT DOCUMENTS

| | | | |
|---|---|---|---|
| 7,010,167 B1 * | 3/2006 | Ordowski | G06K 9/6267 345/644 |
| 7,149,695 B1 * | 12/2006 | Bellegarda | G10L 15/1815 704/251 |
| 8,290,867 B2 | 10/2012 | Nielsen et al. | |
| 8,352,452 B2 | 1/2013 | Dean et al. | |
| 8,412,747 B1 | 4/2013 | Harik et al. | |
| 8,572,181 B1 | 10/2013 | Harik et al. | |
| 8,619,978 B2 | 12/2013 | Harik et al. | |
| 8,639,742 B2 | 1/2014 | Fredricksen et al. | |
| 8,688,720 B1 | 4/2014 | Harik et al. | |

(Continued)

OTHER PUBLICATIONS

Luenberger, David G., "The Conjugate Residual Method for Constrained Minimization Problems", Siam J. Numer. Anal, vol. 7, No. 3, Sep. 1970, pp. 390-398.

(Continued)

*Primary Examiner* — David Vincent
(74) *Attorney, Agent, or Firm* — VLP Law Group LLP; Edward Kwok

(57) ABSTRACT

A method provides program structures for constructing a program that is learned over training data. In one example, two specific program structures are provided in which the first program structure transforms each vector in an input tuple of vectors to provide an output tuple of vectors, and the second program structure operates on an input tuple of vectors to provide an output tuple of vectors by applying one or more transformations that each involves two or more vectors in the input tuple. The transformations of the first and second program structures may be linear transformations. The program may alternatively execute the first program structure and the second program structure in any suitable order a number of times, beginning with operating one of the program structures on an initial tuple of vectors. The vectors may each consist of an ordered set of real numbers.

13 Claims, 1 Drawing Sheet

(56) References Cited

U.S. PATENT DOCUMENTS

| | | | |
|---|---|---|---|
| 8,768,302 B2 | 7/2014 | Coleman et al. | |
| 8,788,475 B2 | 7/2014 | Fredricksen et al. | |
| 8,825,754 B2 | 9/2014 | Fredricksen et al. | |
| 9,129,390 B2* | 9/2015 | Dewaele | |
| 9,141,589 B2 | 9/2015 | Shazeer et al. | |
| 9,166,806 B2 | 10/2015 | Dean et al. | |
| 9,185,098 B2 | 11/2015 | Harik et al. | |
| 2001/0016080 A1* | 8/2001 | Goyal | H04S 1/00 382/251 |
| 2006/0098871 A1* | 5/2006 | Szummer | G06K 9/00422 382/173 |
| 2006/0129351 A1 | 6/2006 | Washizawa | |
| 2009/0281981 A1* | 11/2009 | Chen | G06N 99/005 706/56 |
| 2009/0297046 A1* | 12/2009 | Zhao | G06K 9/6234 382/224 |
| 2010/0157372 A1 | 6/2010 | Qiao et al. | |
| 2010/0185659 A1* | 7/2010 | Bai | G06F 17/30663 707/769 |
| 2014/0214735 A1 | 7/2014 | Harik | |
| 2014/0279748 A1 | 9/2014 | Harik | |

OTHER PUBLICATIONS

Iulian Stroia et al., GPU accelerated geometric multigrid method: comparison with preconditioned conjugate gradient, 2015 IEEE, 6 pages.

Mihai Francu et al., Minimum Residual Methods for Cloth Simulation, Proceedings of the $18^{th}$ International Conference on System Theory, Control and Computing, Sinaia, Romania, Oct. 17-19, 2014, IEEE, pp. 550-555.

Noor Atinah Ahmad, A Globally Convergent Stochastic Pairwise Conjugate Gradient-Based Algorithm for Adaptive Filtering, pp. 914-917, IEEE Signal Processing Letters, vol. 15, 2008.

Benyounes Oukarfi et al., Parametric identification by minimizing the squared residuals (Application to a photovoltaic cell), 2013, IEEE, 6 pages.

* cited by examiner

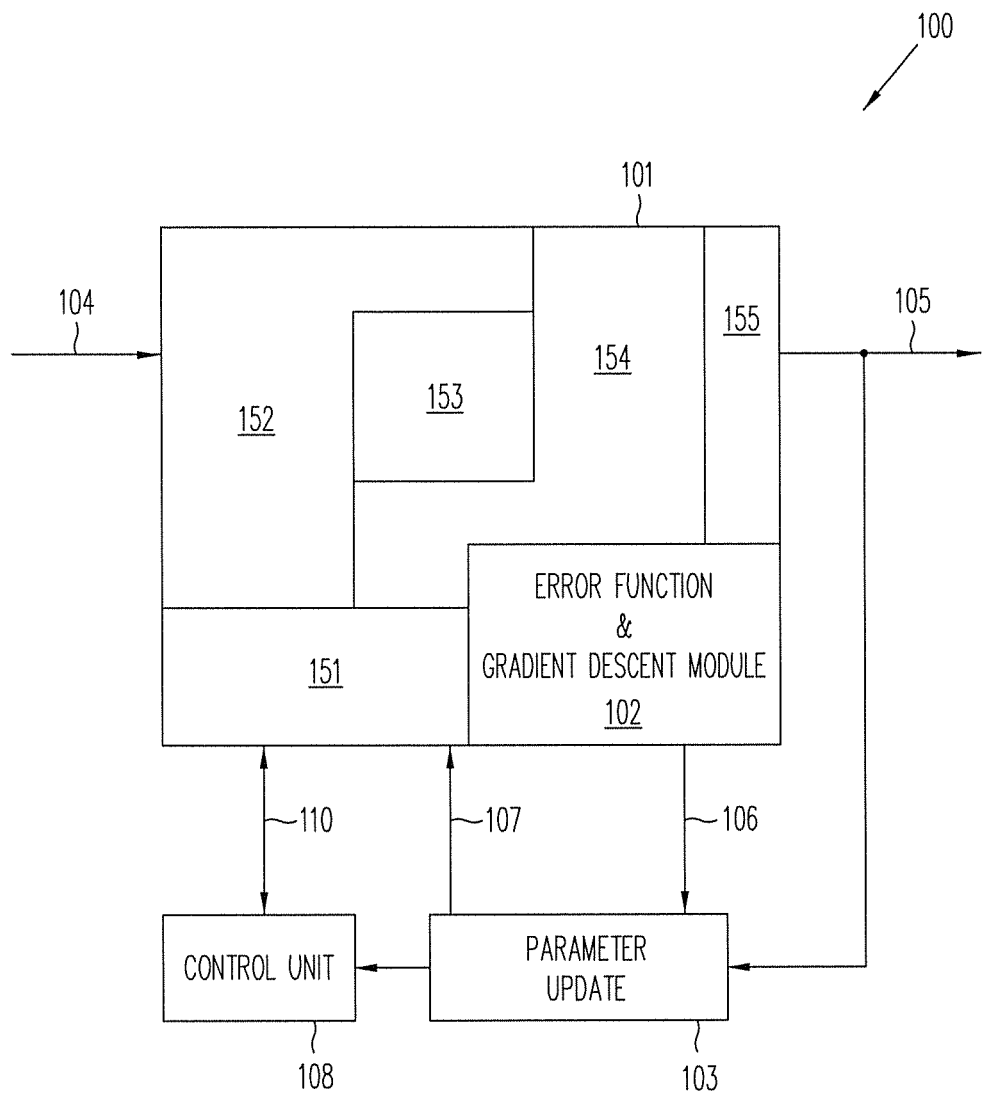

CONFIGURING AND OPTIMIZING COMPUTATIONAL STRUCTURE FOR A MACHINE LEARNING APPLICATION USING A TUPLE OF VECTORS

CROSS REFERENCE TO RELATED APPLICATIONS

The present application relates to and claims priority of U.S. provisional patent application ("Provisional Application"), Ser. No. 61/776,628, entitled "METHOD AND PROGRAM STRUCTURE FOR MACHINE LEARNING," filed on Mar. 11, 2013. The disclosure of the Provisional Application is hereby incorporated by reference in its entirety.

BACKGROUND OF THE INVENTION

1. Field of the Invention

The present invention relates to programs that acquire their capability by a learning process using training data. In particular, the present invention relates to methods and program structures that can be used to construct programs that can be trained by such a learning process.

2. Discussion of the Related Art

Learning problems are often posed as problems to be solved by optimizing, minimizing or maximizing specific parameters of a particular program. While many methods have been developed to solve these kinds of problems, including local methods (e.g., derivative-based methods) and global methods, less attention is paid to the particular structures of the programs that solve such problems.

SUMMARY

The present invention provides a method for constructing a program that is learned over training data. The program is constructed using two specific program structures. The first program structure transforms each vector in an input tuple of vectors to provide an output tuple of vectors. The second program structure operates on an input tuple of vectors to provide an output tuple of vectors by applying one or more transformations that each involves two or more vectors in the input tuple. The transformations of the first and second program structures may be linear transformations. The program may alternatively execute the first program structure and the second program structure in any suitable order a number of times, beginning with operating one of the program structures on an initial tuple of vectors. The vectors may each consist of an ordered set of real numbers.

According to one embodiment of the present invention, the first program structure may include one or more linear transformations and a predetermined function that operates on the result of one of the linear transformations. In one instance, a first one of the linear transformations maps an input from $R^N$ space to $R^M$ space and a second one of the linear transformations maps an input from $R^M$ space to $R^N$ space, N and M being integers. In that embodiment, the predetermined function is a threshold function that operates on the result of the first linear transformation. The first linear transformation may be, for example, a number of inner products between a vector in the input tuple and various specific vectors.

According to one embodiment of the present invention, each transformation of the second program structure may operate on vectors of the input tuple that are separated by a predetermined distance, with the results of being summed. The transformations of the second program structures may operate on vectors of the input tuple that are separated by successively increasing distances, such as successive powers of two.

The present invention is applicable, for example, on programs that are used to perform data prediction. The results from the data prediction may be presented as a probability distribution over a set of candidate results.

The present invention is better understood upon consideration of the detailed description below.

BRIEF DESCRIPTION OF THE DRAWINGS

FIG. 1 is a block diagram of one implementation of program learning system 100 for learning a target function, according to one embodiment of the present invention.

DETAILED DESCRIPTION OF THE PREFERRED EMBODIMENTS

This detailed description includes examples illustrated by executable code. While the copyright owner of the executable code hereby grants permission for reproduction of the executable code made in conjunction with a reproduction of this detailed description, the copyright owner reserves all other rights whatsoever of the executable code, including the right to computer execution.

According to one embodiment of the present invention, a program to be optimized using training data may include two program structures that are alternately exercised over tuples of vectors of N real numbers (i.e., over space $R^N$), where N is an integer. The vectors are derived from the input data, which is also typically a set of vectors over space $R^N$. The parameters of the program structures are adaptively optimized using the training data.

In one embodiment, one program structure (which is referred to as the "recognizer") operates on an input tuple of vectors. The recongnizer first applies a linear transformation $L_0: R^N \rightarrow R^M$, which maps each vector of the input tuple from an $R^N$ space to a $R^M$ space, where N and M are integers. One example of linear transformation $L_0$ is a number of inner products of an input vector and various specific vectors. The recognizer then applies a predetermined function $f: R^M \rightarrow R^M$ to each result of the $L_0$ transformations. For example, the predetermined function may be the threshold function $f(x)=0$, if $x<c$, and x, otherwise; where c is a given real number. Having applied the predetermined function to each result of the $L_0$ transformation, the recognizer applies a linear transformation $L_1: R^M \rightarrow R^N$ to each result of the predetermined function to create a result vector back in $R^N$. For example, linear transformation $L_1$ may take the results of the applications of the predetermined function to each $L_0$ transformation to form elements of an output $R^N$ vector. The recognizer therefore filters each input vector to obtain therefrom an output vector representing a desired filtered value.

In one embodiment, the second program structure (which is referred to as the "convolutioner") operates on a tuple of vectors in the $R^N$ space. For example, the convolutioner may take a number of matrices to perform linear transformations on the input tuple of vectors. In one example, a convolutioner takes three matrices $C_0$, $C_1$, and $C_2$ and applies the matrices to a tuple of five input vectors ($A_1, A_2, A_3, A_4, A_5$), each a vector in $R^N$. In that example, a convolution involving matrices $C_0, C_1, C_2$ is applied to each vector of the tuple and one or more neighboring vectors in the tuple, with the neighboring vectors being separated from the given vector by a separation of $1^1$. In this instance, the result provided by the convolutioner is also a tuple with five vectors in $R^N$ space:

In the tuple $(A_1, A_2, A_3, A_4, A_5)$, vector $A_0$ is separated from vector $A_1$ by a distance of 1, from vector $A_2$ by a distance of 2, from vector $A_3$ by a distance of 3, etc.

$(A_1*C_1+A_2*C_2,$ $A_1*C_0+A_2*C_1+A_3*C_2,$ $A_2*C_0+A_3*C_1+A_4*C_2,$ $A_3*C_0+A_4*C_1+A_5*C_2,$ $A_4*C_0+A_5*C_1)$

In this example, the convolutioner mixes together input vectors (and hence information therein) within the predetermined distance. The convolutioner may perform additional convolutions to mix vectors separated by other suitable distances. In one embodiment, the convolutions are performed at successively increasing distances. In one instance, the distances are powers of two (e.g., 1, 2, 4, . . . , $2^P$, P>2). The matrices used in each convolution may vary according to the separation distance. The convolutioner therefore filters the input tuple of vector to provide an output tuple of vectors in which the vectors in the output tuple each incorporate desired information from other vectors in the input tuple.

As mentioned above, the two types of program structures (i.e., recognizer and convolutioner) may be used alternatingly in a program. During the training process the parameters of the program are optimized by the training data. In one instance, a program constructed using the program structures of the present invention is used to predict a next word or a missing word in a given string of words. In that application, each word in the input is represented by a vector. By training the program using a large corpus of text, the program may be used to predict one or more words to follow the input text fragment or missing word or words in the input text fragment. In that application, the output of the program may be a probability distribution over words in a collection of candidate words (e.g., a dictionary). For each missing word or next word to be predicted, each word in the collection is assigned a value that represents the likelihood that the word is the word to be predicted. A program having the program structures of the present invention may exponentiate that value before normalizing it with the exponentiated values of all the other candidate words in the collection. The normalization procedure ensures that the normalized values sum to 1.0, as is fitting of a probability distribution.

The following code in a variant of the programming language Lisp implements a particular pair of recognizer and convolutioner program structures and a 'forward' function that combines the results from the program structures with a final transformation into the space of possible words:

```
(pdef g_1_base 128)
(pdef g_1_recognize 2048)
// use 3 convolution matrices, to run a function
// if extend is non-nil extends one to the right
(def ad-convolution (lambda (input conv-matrices f step)
 (let c0 (aref conv-matrices 0)
 (let c1 (aref conv-matrices 1)
 (let c2 (aref conv-matrices 2)
 (let len (length input)
 (dotimes i len
```

-continued

```
 (let v (marray)
 (let m0 (if (< -1 (- i step)) (aref input (- i step)))
 (let m1 (if (< i (length input)) (aref input i))
 (let m2 (if (< (+ i step) (length input)) (aref input (+ i step)))
 (progn
 (if m0 (push-back v (f c0 m0)))
 (if m1 (push-back v (f c1 m1)))
 (if m2 (push-back v (f c2 m2)))
 (ad-add-array v))))))))))))
(def ad-recognize (lambda (cbias input transform bias rtransform start)
 (let src (todouble (matrix_cols transform))
 (let dest (todouble (matrix_rows transform))
 // maybe make transform-z and rtransform-z transposes?
 (let transform-z (ad-incidence (matrix_rows transform)
(matrix_cols transform) g_sampling)
 (let transform-x (ad-hadamard transform-z transform _1)
 (let rtransform-z (ad-incidence (matrix_rows rtransform)
(matrix_cols rtransform) g_sampling)
 (let rtransform-x (ad-hadamard rtransform-z rtransform _1)
 (let len (length input)
 (let biasx (ad-mult-s bias cbias)
 (let l1 (dotimes i len
 (if (< i start) nil
 (ad-cutoff
 (ad-add-array
 (array biasx
 (ad-scale
 (ad-mult transform-x (aref input i) nil nil)
 (/ _1.5 (sqrt src))
 ))))))
 (let l2 (dotimes i len
 (if (< i start) nil
 (ad-scale
 (ad-mult rtransform-x (aref l1 i) nil nil)
 (/ _0.5 (sqrt dest))
 )))
l2))))))))))))
(def recognizer-recognize (lambda (r cbias input start)
 (ad-recognize cbias input (aref r 0) (aref r 1) (aref r 2) start)))
(def make-recognizer (lambda (base_n rec_n)
 (let ret (marray)
 (progn
 (push-back ret (model-new rec_n base_n))
 (push-back ret (model-new rec_n 1))
 (push-back ret (model-new base_n rec_n))
 ret))))
(def words (model-new g_max_word g_1_base))
// (def last-words (model-new g_max_word g_1_base))
(def l1conv (dotimes i 3 (model-new g_1_base g_1_base)))
(def l3 conv (dotimes i 3 (model-new g_1_base g_1_base)))
(def l5conv (dotimes i 3 (model-new g_1_base g_1_base)))
(def l7conv (dotimes i 3 (model-new g_1_base g_1_base)))
(def l9conv (dotimes i 3 (model-new g_1_base g_1_base)))
(def l2rec (make-recognizer g_1_base g_1_recognize))
(def l4rec (make-recognizer g_1_base g_1_recognize))
(def l6rec (make-recognizer g_1_base g_1_recognize))
(def l8rec (make-recognizer g_1_base g_1_recognize))
(def l10rec (make-recognizer g_1_base g_1_recognize))
// Return anything you want to, first is the predicted result
// later, second can be a contributed error matrix
(def forward (lambda (input)
 (let len (length input)
 (let group_size (matrix_rows (aref input 0))
 (let cbias (ad-constant 1 group_size _1)
 (let l1 (dotimes i len (ad-transpose (ad-slice words (aref input i))))
 (let l1 c (dotimes i len
 (if (< i (- len 1)) (aref l1 i)
 (ad-constant (matrix_rows (aref l1 i)) (matrix_cols (aref l1 i)) _1)))
 (let l2 (ad-convolution l1c l1conv ad-mult-s 1)
 (let l3 (recognizer-recognize l2rec cbias l2 0)
 (let l4 (ad-convolution l3 l3 cony ad-mult-s 2)
 (let l5 (recognizer-recognize l4rec cbias l4 0)
 (let l6 (ad-convolution l5 l5conv ad-mult-s 4)
 (let l7 (recognizer-recognize l6rec cbias l6 0)
 (let l8 (ad-convolution l7 l7conv ad-mult-s 8)
 (let l9 (recognizer-recognize l8rec cbias l8 0)
```

-continued

```
(let l10 (ad-convolution l9 l9conv ad-mult-s 16)
(let l11 (recognizer-recognize l10rec cbias l10 0)
(let e1 (ad-predict-end l11 input words)
e1)))))))))))))))))
```

In this code, the function ad-convolution implements the basic process of the convolutioner. In ad-convolution, an input value is a tuple of vectors (or matrices, so as to combine multiple examples together). The value conv-matrices contain the matrices C0, C1 and C2, and the function f is typically multiplication, although other functions can also be used. The function Ad-add-array adds the results. In the function ad-recognize, an extended recognizer is implemented that linearly transforms the tuple of input vectors, which comprise vectors to be recognized. After the initial linear transformation in the recognizer, a vector is subtracted from each result vector of the linear transformation. (In the code about, rather than subtraction, the result vector is actually added to vector bias-x, which may include negative numbers). The function Ad-cutoff applies a threshold function to the results of the first linear transformation, preparing it for the second linear transformation. This particular implementation includes randomized matrices (called "incidence matrices") that are multiplied with the input vectors. In this example, the convolutioner applies mix input vectors of increasing separations, so as to take into account information in vectors that are further and further apart.

In the example above, the transformations of 11 to 11c illustrate how some input data may be hidden from the system, so as to avoid over training the system (i.e., rather than predicting the missing information, the system merely outputs "from memory" the training data). At the end of the procedure, the function ad-predict-end implements another linear transformation on the last part of the information remaining, in order to product a vector of the information to be predicted. That vector is component-wise exponentiated in the function ad-predict-end, and the result is normalized to a sum of 1.0. The function ad-predict-end thus predicts values that constitute a probability distribution over the possible outputs.

FIG. 1 is a block diagram of one implementation of program learning system 100 for learning a target function, according to one embodiment of the present invention. In this description, merely by way of example, the target function is the text prediction function described above, performed over training data consisting of a corpus of documents. However, many other suitable applications are possible and within the scope of the present invention. As shown in FIG. 1, program learning system 100 includes learning program 101, which implements the target function to be learned. Learning program 101 receives input vector 104 from the training data and model parameter values 107 to provide output vector 105. Input vector 104 may include, for example, the textual search query. Output vector 105 is, for example, a "best next word" probability distribution computed by learning program 101 based on model parameter values 107 over the documents in the training data. Integrated into learning program 101 is stochastic gradient descent module 102 which carries out evaluations of the loss or error function and the gradient vector 106 for the loss or error function with respect to model parameters values 107. One possible implementation of stochastic gradient descent module 102, which uses the Newton's method in conjunction with a method of conjugate residuals to obtain output vector 105 and gradient vector 106, is described, for example, in the copending U.S. patent application Ser. No. 14/165,431, entitled "Method for an Optimizing Predictive Model using Gradient Descent and Conjugate Residuals," filed on Jan. 27, 2014. The disclosure of the '431 patent application is hereby incorporated by reference in its entirety. Output vector 105 and gradient vector 105 are then provided to parameter update module 103. Updated parameter values 107 are fed back into configuring learning program 101.

Learning program 101 may be implemented in a computational environment that includes a number of parallel processors. In one implementation, each processor may be a graphics processor, to take advantage of computational structures optimized for arithmetic typical in such processors. Control unit 108 (e.g., a host computer system using conventional programming techniques) may configure the computational model for each program to be learned.

As shown in FIG. 1, learning program 101 may be organized, for example, to include control program structure 151, recognizer 152, predetermined function 153, convolutioner 154 and output processing program structure 155. Control program structure 151 configures recognizer 152, predetermined function 153 and convolutioner 154 using model parameter values 107 and control information from control unit 108 and directs data flow among these program structures. Recognizer 152, predetermined function 153, and convolutioner 154 may be implemented according to the detailed description above. Output processing program structure 155 may perform, for example, normalization and exponentiation of the post-convolution vectors to provide the probability distribution of the "next word" to be predicted.

Various extensions to the present invention are possible, including other methods of combining convolutioners with recognizers that allow intelligent recombination of information to predict various parts of the input data, without using information from those parts. Programs of the present invention are useful in various applications, such as predicting stock market movements, building language models, and building search engines based on words appearing on a page and through use of a likelihood function.

The above detailed description is provided to illustrate specific embodiments of the present invention and is not intended to be limiting. Many modifications and variations within the scope of the present invention are possible. The present invention is set forth in the following claims.

I claim:

1. A method for configuring and optimizing a computational structure for a machine learning application using training data which includes an initial set of real number values that is organized as an ordered list of data units, being referred herein as a "tuple of vectors," the initial set of real number values representing a portion of the training data, with each vector in the tuple of vectors being organized as an ordered set of real number values, the method comprising:
configuring a first program in a the computational structure (a) to receive an input tuple of vectors, and (b) to apply a first transformation to each vector in the input tuple of vectors to provide an output tuple of vectors;
configuring a second program in the computational structure (a) to receive an input tuple of vectors, (b) to apply a second transformation on the input tuple of vectors of the second program to provide an output tuple of vectors of the second program, wherein the second transformation comprises (i) one or more operations each involving two or more vectors in the input tuple of vectors, and (ii) summing the results of the operations; and alternating execution of the first program and the second program a plurality of times, beginning with operating a selected one of the first and the second programs using the initial set of real number values as the input tuple of vectors of the selected program and, thereafter, using the output tuple of vectors of each execution of the first program as the input tuple of vectors of the second program in a next execution of the second program, and using the output tuple of vectors of each execution of the second program as the input tuple of vectors of the first program in a next execution of the first program.

2. The method of claim 1, wherein the first transformation comprises one or more linear transformations.

3. The method of claim 2, wherein the first and second tuple of vectors in the first program structure have equal number of real number values.

4. The method of claim 2, further comprising applying a non-linear predetermined function on the result of the first linear transformation.

5. The method of claim 4, wherein the predetermined function comprises a threshold function.

6. The method of claim 2, wherein the first one of the linear transformations includes computing an inner product.

7. The method of claim 1, wherein the two or more vectors occupy positions within the input tuple of vectors received by the second program that are separated by a predetermined distance.

8. The method of claim 7, wherein the predetermined distance increases with each successive operation.

9. The method of claim 8, wherein the increasing predetermined distances are each a power of P, where P is an integer.

10. The method of claim 9, wherein P equals two.

11. The method of claim 1, wherein the operations of the second program comprise linear transformations.

12. The method of claim 1, further comprising, upon exhausting the training data, using the method for data prediction.

13. The method of claim 12, wherein the data prediction is presented as a probability distribution over a set of candidate results.

* * * * *